(12) United States Patent
Schmid et al.

(10) Patent No.: US 7,865,610 B2
(45) Date of Patent: Jan. 4, 2011

(54) POINT TO MULTIPOINT RELIABLE PROTOCOL FOR SYNCHRONOUS STREAMING DATA IN A LOSSY IP NETWORK

(75) Inventors: Philipp Schmid, Hackett's Cove (CA); Scott Martin, Halifax (CA)

(73) Assignee: Nautel Limited, Nova Scotia (CA)

( * ) Notice: Subject to any disclaimer, the term of this patent is extended or adjusted under 35 U.S.C. 154(b) by 275 days.

(21) Appl. No.: 11/716,952

(22) Filed: Mar. 12, 2007

(65) Prior Publication Data

US 2008/0228936 A1 Sep. 18, 2008

(51) Int. Cl.
*G06F 15/16* (2006.01)
*H04J 1/00* (2006.01)
*G01R 31/08* (2006.01)

(52) U.S. Cl. ............... 709/232; 709/230; 709/236; 370/229; 370/235; 370/486

(58) Field of Classification Search ............ 709/23–236
See application file for complete search history.

(56) References Cited

U.S. PATENT DOCUMENTS

| | | | |
|---|---|---|---|
| 6,879,599 B1 | 4/2005 | Galyas et al. | |
| 7,489,629 B2 * | 2/2009 | Ye et al. | 370/230 |
| 2002/0131428 A1 | 9/2002 | Pecus et al. | |
| 2002/0132629 A1 | 9/2002 | Desai et al. | |
| 2003/0086442 A1 | 5/2003 | Reynolds et al. | |
| 2003/0093530 A1 | 5/2003 | Syed | |
| 2003/0140159 A1 | 7/2003 | Campbell et al. | |
| 2003/0206549 A1 * | 11/2003 | Mody et al. | 370/390 |
| 2005/0008026 A1 * | 1/2005 | Tanaka et al. | 370/437 |
| 2005/0123042 A1 | 6/2005 | Park | |
| 2005/0165948 A1 * | 7/2005 | Hatime | 709/235 |
| 2005/0249139 A1 | 11/2005 | Nesbit | |
| 2006/0062224 A1 * | 3/2006 | Levy et al. | 370/395.6 |

(Continued)

FOREIGN PATENT DOCUMENTS

CA 2299141 9/2000

(Continued)

OTHER PUBLICATIONS

Intel — High Definition Audio Specification, Revision 1.0, Apr. 15, 2004.

*Primary Examiner*—Nathan Flynn
*Assistant Examiner*—Jeong S Park
(74) *Attorney, Agent, or Firm*—McDermott Will & Emery LLP

(57) ABSTRACT

A method and apparatus for improving the reliability in the synchronous streaming of data from a sender to multiple receivers, especially in networks having a limited bandwidth. The sender is configured to change the format of the data to be sent by segmenting the data into packets having maximum size, and identifying each packet with a message number. The transmit rate of the sender is adjusted according to the throughput bandwidth of the link so as to avoid congesting the link. Each receiver is configured to re-assemble the packets based upon the message number allocated to each packet, and re-create the data in the original format for being read by standard HDj Radio Exciters. The Receivers may also be configured to keep track of the packet numbers and request re-transmission of lost packets, using the ARQ (Automatic Retransmission Request) scheme.

20 Claims, 9 Drawing Sheets

U.S. PATENT DOCUMENTS

| | | |
|---|---|---|
| 2006/0206618 A1 | 9/2006 | Zimmer et al. |
| 2006/0209941 A1 | 9/2006 | Kroeger |
| 2008/0130686 A1* | 6/2008 | Milbar ........................ 370/486 |

FOREIGN PATENT DOCUMENTS

| | | |
|---|---|---|
| CA | 2 437 546 | 8/2002 |
| CA | 2 437 725 | 8/2002 |
| CA | 2 441 487 | 8/2002 |
| CA | 2 456 912 | 2/2003 |
| EP | 1 041 758 | 3/2004 |
| EP | 1 471 745 | 10/2004 |
| WO | 01/86905 | 11/2001 |
| WO | 03/038637 | 5/2003 |
| WO | 2005/032026 | 4/2005 |
| WO | 2005/034414 | 4/2005 |

* cited by examiner

POINT TO MULTIPOINT RELIABLE PROTOCOL FOR SYNCHRONOUS STREAMING DATA IN A LOSSY IP NETWORK

FIELD OF THE INVENTION

The invention relates generally to a point to multipoint protocol for synchronous streaming of data in a lossy IP network. More particularly, the invention relates to a method and system for the broadcasting of real-time data in a bandwidth limited network, such as the broadcasting of high definition radio signals between an exporter at the studio and one or more exgine exciters at the transmitter.

BACKGROUND OF THE INVENTION

The protocol used for connecting between the exporter and the engine-exciter (also known as exgine) in a radio station, is known as the exporter to exgine protocol E2X, as defined by IBIQUITY DIGITAL CORPORATION₇. This protocol performs two main functions. The first function is the transmission of HD Radioᴊ (High Definition) data, from the exporter at the studio to the exgine at the transmitter. The second function is the synchronisation of the exporter with the exgine.

FIG. 1 illustrates a basic overview the third generation IBOCᴊ radio broadcast system architecture. This architecture differs from previous generations in that most of the IBOCᴊ functions and equipment are moved from the transmitter site to the studio site.

The only function in the IBOCᴊ system that remains at the transmitter site is the digital IBOCᴊ modulation performed inside the exciter engine (Exgine) modulator board. Keeping the modulation function at the transmitter site is necessary because the digital bit stream to be modulated can be transferred in fewer than 150 kbps. IBOCᴊ modulation turns this bit stream into a discrete time signal that requires the equivalent of 23 Mbps to be transferred across an STL. Though required to contain the complete FM baseband frequency spectrum, it is inefficient to carry this amount of information across RF based STLs.

The transmitter site receives two data feeds from the studio: an audio feed for traditional FM broadcast, which may be carried in any digital or analog industry standard, and an Ethernet based digital data stream for IBOCᴊ modulation. This digital data stream is not limited to carrying audio data and may contain program service data or other data services along with one or more additional compressed audio streams.

The major IBOCᴊ system components at the studio site are the Exporter, Importer and system synchronization unit. The Exporter=s responsibilities include delaying the analog audio to match the digital on-air delay and passing the audio signal to the STL. On the digital side, the Exporter performs the audio coding of the digital main program and multiplexing all digital content including program service data for the main program, as well as, all digital content originating from the Importer.

The Importer can capture two additional audio feeds for secondary program services which are encoded in the Importer and are passed to the Exporter along with their corresponding program service data.

The broadcast architecture is synchronous in nature in that a discrete number of audio samples captured at the studio translates into a discrete number of digital symbols produced at the exciter. The synchronization unit synchronizes the incoming audio feed to a GPS based timing reference, which in turn affects the timing of all operations in the system.

The STL link must be able to carry Ethernet/IP based traffic along with traditional audio streams, requiring a digital STL. Many stations have transitioned to digital STLs in favor of a digital audio feed over an analog feed for improved audio quality. Most STL vendors now provide upgrade paths to share the existing digital STL bandwidth between audio paths and Ethernet based paths. However, since most STLs have traditionally been unidirectional in nature, many STLs today also only provide a unidirectional Ethernet path. Even basic network functions, such as the address resolution protocol, often require a bidirectional data path between a sender and receiver on a network. It is important that the digital data stream protocol does not require a bidirectional data path, but it may make use of a bidirectional link if one is present.

Classifying the bandwidth requirements of the data portion of the digital data stream is relatively straight forward and iBiquity Digital Corporationᴊ has sufficiently detailed these requirements. The bandwidth requirements for the synchronization stream, on the other hand, are more difficult to determine.

The E2X may employ the TCP/IP mode for bidirectional STL (Studio to Transmitter link). The TCP/IP mode addresses intermittent packet loss through data retransmission, but requires an additional 40% of the STL bandwidth for overhead and control data, which is undesirable in bandwidth limited links. In addition to this disadvantage, the TCP/IP mode does not allow for point-to-multipoint communication, which requires a separate exporter at the studio for each exgine at the transmitter. Furthermore, TCP windowing provides flow control, which results in a delayed data delivery and possible disconnection. However, since data packets are only useful if they are received prior to when they are scheduled to be transmitted delayed data will be discarded if it is received after it is scheduled to be broadcasted on air. Moreover, the loss of the TCP/IP connection requires re-connection, which translates into an extended outage of data streaming.

The E2X synchronization scheme places stringent STL throughput requirements on the link. In order to pass a data packet of 19330 bytes (MP3) within 92.8 ms, a dedicated bandwidth of at least 1.59 Mbps is needed, not withstanding additional packet overhead. The latter makes exgine synchronization dependent on packet throughput delays and compression efficiency, service modes, additional traffic, and link throughput bit rate changes. Clock packets no longer are a measure of throughput delay for any link that cannot guarantee the above bandwidth. On a 256 kbps link, this packet takes in excess of 600 ms to be transferred. As illustrated in FIG. 2, the instantaneous bit rate required by E2X causes the STL to periodically enter a congestion state, making the link very unresponsive to other traffic on the link, and inflicts a cyclically patterned error on the E2X synchronisation stream, which leads to an incorrect measure of link throughput delay. The heavy filtering exhibited by the synchronisation stream does not remove this error. While TCP/IP addresses intermittent bit errors and packet loss, its retransmission scheme does not consider the synchronization stream potentially exacerbating the congestion problem.

Accordingly, since the TCP/IP mode is designed for data transfer, and guaranteed delivery of data on the expense of the speed, the TCP/IP cannot be relied upon for real time streaming. The alternative is the User Datagram Protocol (UDP) mode which lends itself to unidirectional real time streaming of data. The UDP is connectionless, and allows for point-to-multipoint communication using broadcast or multicast mode on a unidirectional link.

However, to provide an overall sufficient quality of service, the standard UDP mode requires an extremely reliable network with a Bit Error Rate of almost zero, because UDP does not guarantee any data delivery and the application using UDP must tolerate the loss of data. In the case of HDj data transmission, the loss of a single packet translates into a 1 to 2 seconds of HDj outage. For instance, if the end-user quality of service (QoS) is intended to be 99.999% then the average packet loss should be 1 in 1.6 millions which translates into a 1 to 2 seconds outage in every 41.1 hours of broadcasting. If the QoS drops to 99.99% the average packet loss will be 1 in every 160,000 packets. If it drops further to 99.2%, the average packet loss is 1 in every 2000 packets, and so on.

Several attempts have been made in the past to address the problem of providing data to multiple users in bandwidth limited networks. For instance, International Patent Application No. 050,320,26 (Fuchs et al.) describes a method for multi-casting data to a plurality of users. The method includes the steps of transmitting a notification on an upcoming multicast transmission to a plurality of receivers designated to receive the multicast transmission; tuning by at least one of the plurality of receivers to one or more multicast channels responsive to the notification; transmitting a data file from a data server on the one or more multicast channels without receiving acknowledgments from the receivers at the server as to whether they received the notification or not; determining receivers designated to receive the multicast transmission that did not receive at least a portion of the data file; and attempting to deliver the data file to the determined receivers.

United States Patent Application Publication No. 2006/0206618 (Zimmer et al.) describes a method and an apparatus for providing remote audio using an out-of-band (OOB) communication channel. The method enables audio content to be broadcasted from a media host to multiple media clients using an OOB communication channel that is transparent to operating systems running on the media host and clients. Audio content can be read from a CD-ROM, DVD, or hard disk drive, at the media host. The audio data is packetized using an OOB networking stack and transferred to the media clients, whereupon the packets are processed by a client-side OOB networking stack. The audio data is then extracted from the packets and provided to an audio sub-system to be rendered. In one embodiment, the apparatus comprises an input/output controller hub (ICH) including an embedded High Definition audio sub-system and a separate LAN micro-controller.

Canadian Patent No. 2,299,141 (Yue et al.) describes a method for use in a packet server. The method includes the steps of formatting the data packets in accordance with Lightweight. IP Encapsulation using IP/UDP transport. The packet encapsulated in this format includes a UDP header field and at least one multiplexing header and an associated multimedia data packet. The multiplexing header comprises a user identifier field, a length indicator field, and a Amore@ field used to indicate the use of more than one multiplexing header and associated multimedia data packet for transporting incoming data packets.

United States Patent Application Publication No. 2003/0086442 (Reynolds et al.) describes a method for recovering clock signals including generating a media sync signal to synchronize processing of digital media, and generating a transmission reference clock signal to define a duration of a transaction through a packet-based data network. The media sync is sent to a slave node of the network. The media sync and transmission clock signals are correlated to generate phase correlation information, and the phase correlation information is also sent to the slave node.

United States Patent Application Publication No. 2006/209941(Kroeger) describes a method for synchronizing an exciter clock with a modem frame clock in a broadcasting system. The method includes the steps of receiving a plurality of modem frame pulses that are representative of the start of modem frames of audio signals and data signals, wherein timing of the modem frame pulses is controlled by a modem frame clock; producing an exciter clock signal; counting pulses representative of the exciter clock signal to produce a count representative of timing error of each incoming modem frame pulse, and controlling the exciter clock signal in response to the count.

International Patent Application No. 2005/034414 (Compton et al.) describes a method of synchronizing the phase of a local image synchronisation signal generator of a local video data processor in communication with an asynchronous switched packet network to the phase of a reference image synchronisation signal generator of a reference video data processor also coupled to the network. The local and reference processors have respective clocks, and the reference and local image synchronisation signal generators generate periodic image synchronisation signals in synchronism with the reference and local clocks, respectively.

SUMMARY OF THE INVENTION

Accordingly, there is an escalating need for a reliable transmission system which allows for a point to multipoint streaming of data, in bandwidth limited networks.

In an aspect of the present invention there is provided a data transmission system for improving the streaming of data between a sender and at least one receiver over a connection link, wherein the sender is configured to change the format of the data to be sent by segmenting and encapsulating the data into packets of a maximum size, and identifying each packet with a message number, wherein a transmit rate of the sender is adjusted according to the throughput bandwidth of the link so as to avoid congesting the link; and the receiver is configured to re-assemble the packets based upon the message number allocated to each packet, and re-create the data in the original format for being read by standard applications.

In another aspect of the invention, the concept is applied to the E2X protocol for streaming data between an exporter and an exgine, using the UDP/IP protocol, wherein by executing statements and instructions recorded on a first storage memory, the exporter perform operations including:

inputting standard E2X packets and segmenting these into smaller segments, and assigning a sequence number for each segment;

placing the segments in a main queue for mixing with segments previously sent and recorded in a buffer for possible re-transmission, and which are selected and stored in a re-transmit queue upon request for re-transmission and identification of the requested segments from the exgine;

scheduling the segments for transmission between the main queue and the re-transmit queue, encapsulating the segments in a new packet including a control header and placing them into a transmit queue for transmission to the exgine, taking into consideration the link throughput bandwidth so as to provide a constant streaming of data in a manner that avoids congesting the link.

By executing statements and instructions recorded on a second storage memory, the exgine may perform operations including:

receiving the encapsulated packets sent from the exporter;

de-capsulating the encapsulated packets and re-assembling the segments in order of segmentation at the exporter based upon the sequence number and message number of each segment; and sending the re-assembled segments to the exgine as standard E2X packets; whereby the data transmission system improves the reliability of transmission by providing a relatively constant bit rate data stream, and maintains backward compatibility with the pre-existing E2X protocol.

In a further aspect of the invention, there is provided a method for streaming data between an exporter and at least one exgine using the E2X protocol over a connection link using the UDP/IP protocol, the method includes the steps of:

inputting standard E2X packets and segmenting these into smaller segments;

assigning a sequence number to each segment representing the rank of the segment in the packet, and a message number representing the packet to which the segment belongs, and placing the segments in a main queue;

checking a re-transmit queue for the existence of other segments requested for re-transmission by the exgine, and which can be retrieved from a buffer which records the previously sent segments;

scheduling the segments for transmission between the segments found in the main queue and those found in the re-transmit queue and encapsulating these segments into packets having a maximum size;

transmitting the encapsulated packets and adjusting the transmit rate based upon the link throughput bandwidth so as to avoid congesting the link;

receiving the encapsulated packets at an exgine and re-assembling the segments in order of segmentation at the exporter based upon the sequence number and message number of each segment, and re-creating the standard E2X packets which can be read by a standard exgine; whereby the reliability of transmission can be improved while maintaining backward compatibility with the pre-existing E2X protocol.

BRIEF DESCRIPTION OF THE DRAWINGS

For a more complete understanding of the present invention and the advantages thereof, reference is made to the following description taken in conjunction with the accompanying figures, in which.

DETAILED DESCRIPTION OF THE INVENTION

The invention is aimed at improving the reliability in the synchronous streaming of data in a bandwidth limited network. In particular, the invention improves the reliability in streaming HDj data between an Exporter at the studio and an engine exciter at the transmitter. Hence, the invention provides an E2X Encapsulation Protocol which can be layered over the conventional E2X protocol for providing backward compatibility with the latter.

The E2X protocol causes a repeating pattern of packets over a 1.48 second frame. The packets are issued at 92.5 ms intervals, hence, 16 intervals per frame. A timing packet is sent in each interval, and there may be a data packet as well. The data packet in the first frame interval is much larger than the data packet that may be sent in following intervals. The imbalance in data packet sizes can cause large deviation in the propagation time of timing packets in a bandwidth limited network, which results in synchronisation failures.

Figure 9:
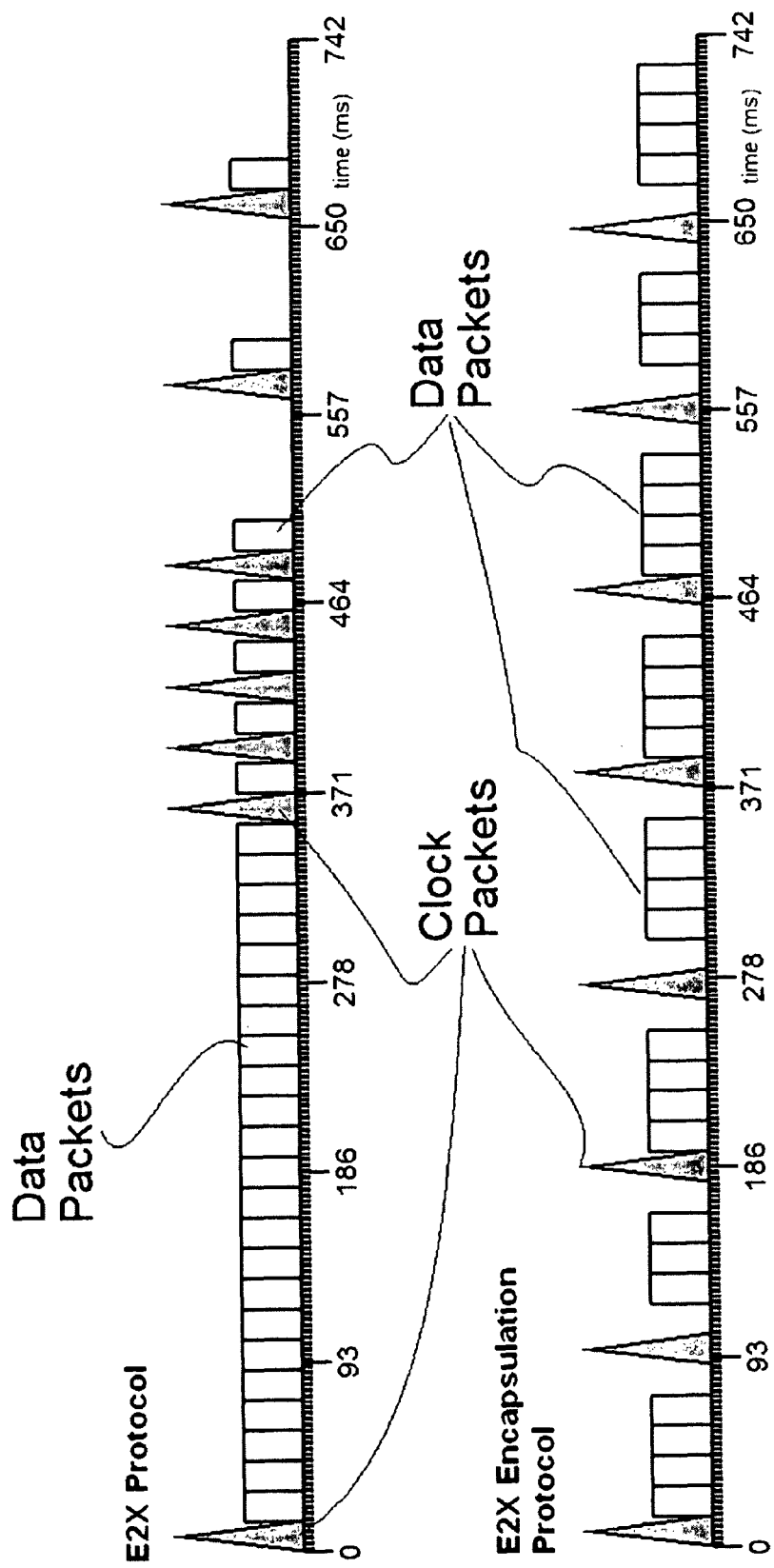
FIG. 9 is graphical representation illustrating the clock packet deviation in the E2X protocol due to the transmission of a large packet, versus the periodical transmission of a clock packet in the E2X Encapsulation Protocol.

The invention addresses the above problems by re-balancing the payload data to allow for clock packet tunneling, and adjusting the transmit rate based upon the STL bandwidth. The E2X Encapsulation Protocol, modifies the E2X packets so that each interval in a frame carries a clock packet followed by one or more data packets without exceeding the available allocated bandwidth. Whereby, clock packet deviation is significantly reduced, as compared to the standard E2X protocol in which the transmission of a large data packet results in a deviation of the following clock packets and a potential loss of synchronisation and inefficient use of the STL, as clearly illustrated in FIG. 9. By adjusting the transmit rate based upon the STL bandwidth, network congestion and transmission delays are significantly reduced, and a constant bit stream is secured across the STL.

Additionally, the E2X protocol sends a configuration packet once, when the E2X exporter is started after reset or a power failure etc. which creates problems for the E2X exgine in the event the latter resets while the exporter is still operating normally and sending information, which leaves the exgine with a possible mismatch of the operational configuration. The E2X Encapsulation protocol is designed to send the configuration packet periodically, so any exciter on the network can leave or tune in and be configured after reset or power on in a maximum delay of 1.48 seconds (frequency of the frame).

The E2X Encapsulation layer is layered on top of UDP/IP for securing a point to multipoint connection between the exporter and a plurality of exgines. The E2X Encapsulation software is comprised of two major modules, the E2X Encapsulation Master and the E2X Encapsulation Slave.

The E2X Encapsulation Master exists on the exporter, but conceptually could exist on any other machine connected to the exporter. However, the exporter to E2X Encapsulation Master data connection is based on UDP and is not reliable, so it must be a high quality network, if the two components are split. The E2X Encapsulation Slave maybe compiled into the exgine binary, exist as an independent network component coupled with a standard E2X Exciter, or maybe be used as a multimedia software component that allows the HD Radioj content to be delivered to an end-user over the network bypassing on the air IBOCj modulation.

Figure 3:
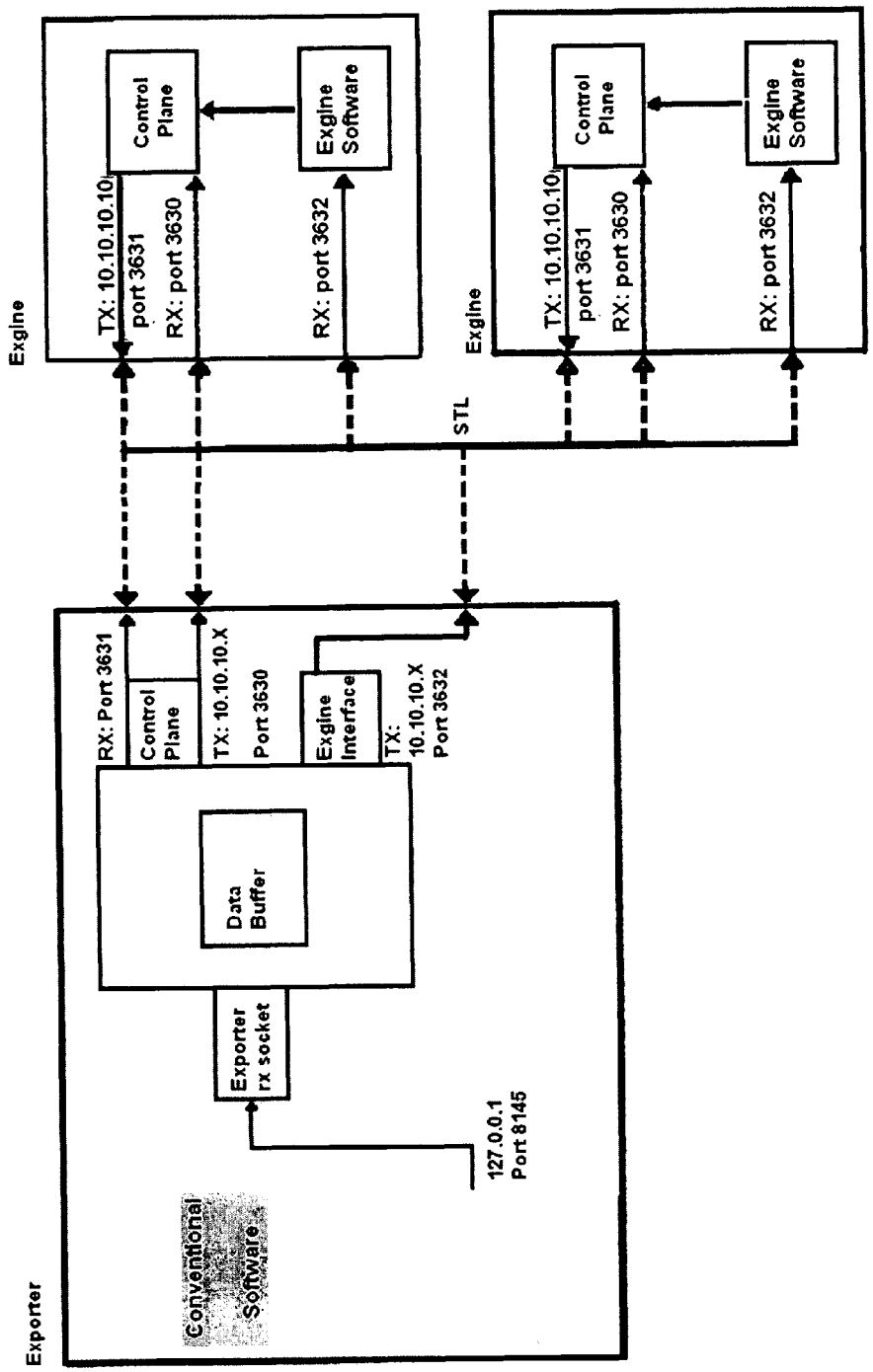
FIG. 3 is a block diagram illustrating an example of the E2X Encapsulation system according to an embodiment of the present invention.

As shown in FIG. 3, both software modules are comprised of a data plane and a control plane. The E2X Encapsulation protocol uses the following port numbers:

| | | |
|---|---|---|
| 3630: | Control port | master to all slaves (broadcast) or master to slave (unicast) |
| 3631: | Control port | slave to master (broadcast/unicast) |
| 3632: | Data port | master to all slaves (broadcast) or master to slave (unicast). |

Accordingly, port 3632 is allocated to the data plane which takes care of the actual data path. Ports 3630 and 3631 are allocated to the control plane which is responsible for control functions such as data packet retransmission requests.

The ports may be reallocated through configuration options, if needed. The exgine maintains the original E2X port number for data reception, so any data received on this port can be multiplexed with the data received from the data plane allowing backwards compatibility with the standard E2X protocol.

Segmentation and Re-Assembly

In order to obtain a constant bit stream across the STL, and minimize timing packet deviation, data packets are segmented to have a maximum size and to allow for clock packet tunneling. The Encapsulation Master software module at the Exporter segments all E2X packets into segments of a maximum PDU length (configurable), which gives the Encapsulation Master transmit-scheduling control, as well as, control over the amount of data retransmission.

Figure 4:
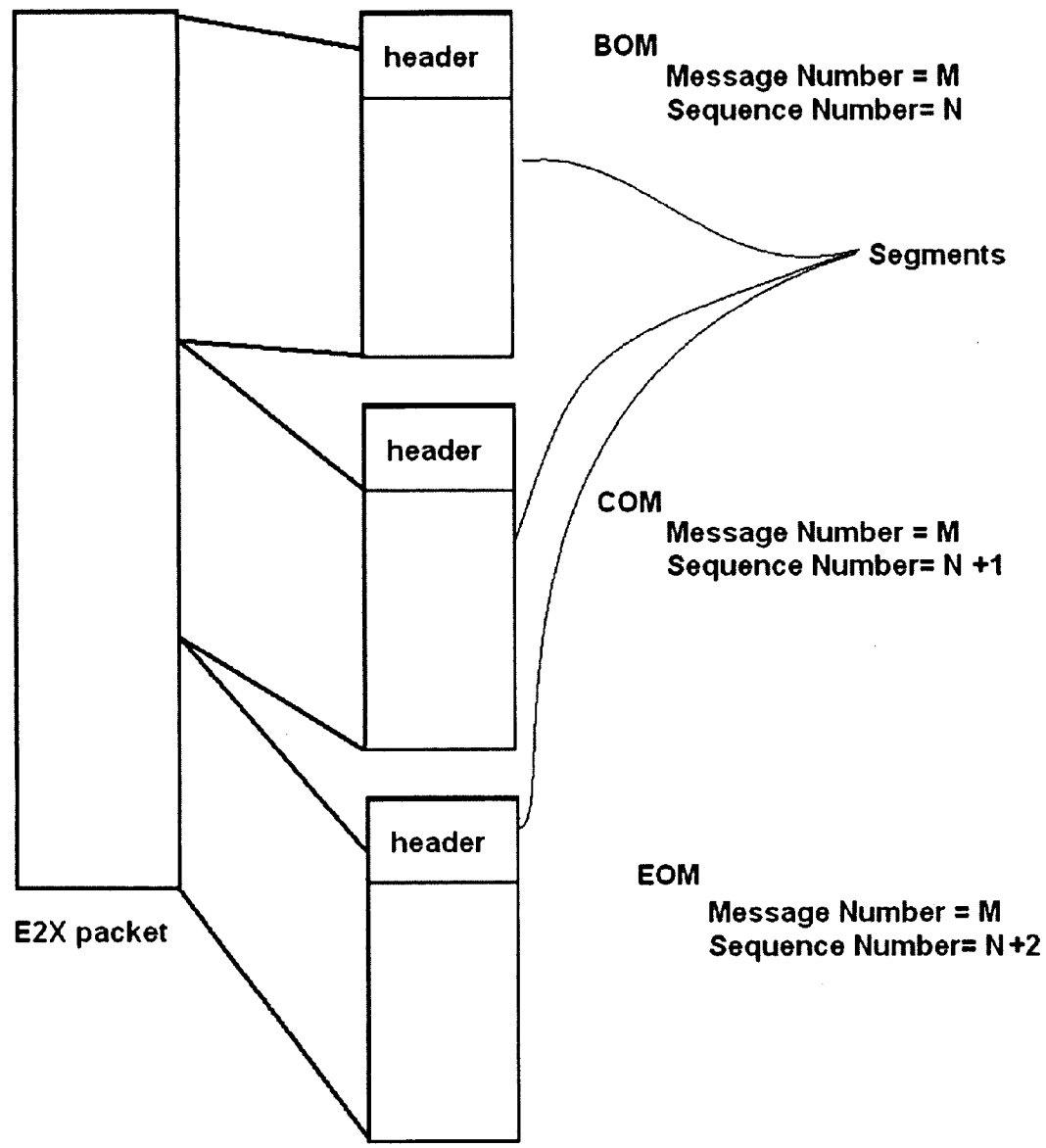
FIG. 4 illustrates the segmentation of packets in accordance with the present invention.

As shown in FIG. 4, segmentation breaks a large PDU into a set of smaller PDUs each identified with a unique sequence number. All segments belonging to a single E2X packet are identified with a common message number used in the reassembly process. A beginning of message (BOM) segment indicates the first segment in a message. An end of message (EOM) segment indicates the last segment in a message. All remaining segments are considered continuation of message (COM) segments.

Segments may be lost entirely, reordered through the link or may have to be re-transmitted across the link. Therefore, the Encapsulation Slave module must be capable of reassembling multiple messages concurrently. Each segment is allocated two numbers: a message number to indicate to which message the segment belongs, and a sequence number to indicate the rank of the segment in the message. For example, as illustrated in FIG. 4, the first segment BOM has a message number M, and a sequence number N, while the next message COM has the same message number M because it belongs to the same message as BOM, however, its rank is N+1 because it is the first message after BOM, and the same for EOM.

As new segments are received at the exgine, exgine first retrieves the reassembly context for the given message number from the active reassembly list. A new reassembly context is started if no existing reassembly context is found for the given message number. The segment is ordered into a list associated with the reassembly context.

Figure 5:
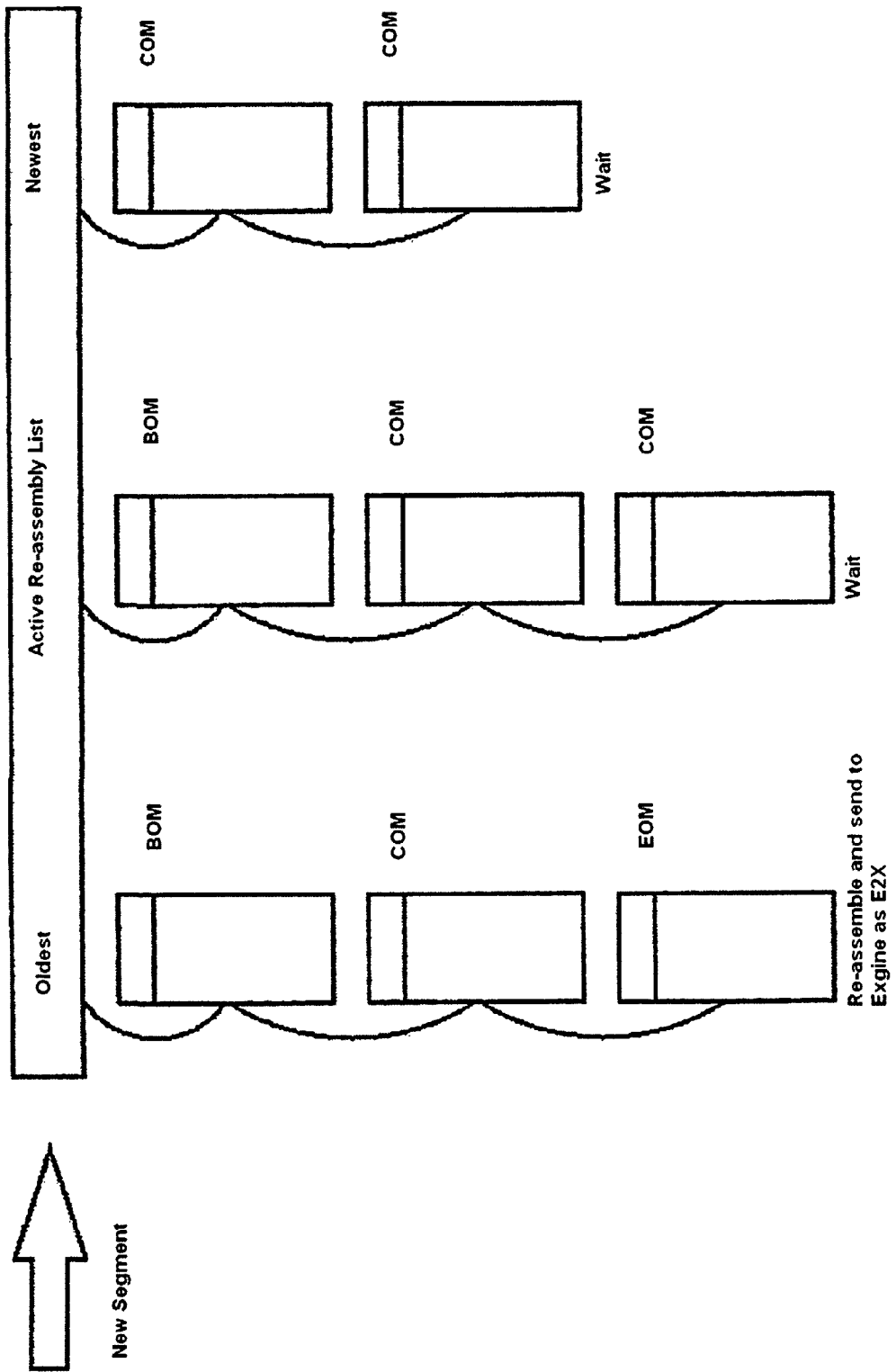
FIG. 5 illustrates the re-assembling process of the segments received at the Exgine.

The reassembly process is illustrated at FIG. 5. A reassembly is complete once all message segments are sequential. At this point, the original E2X packet can be restored and passed to exgine=s regular packet handler, as a standard E2X packet because the E2X Encapsulation protocol is layered on top of UDP/IP and should be compatible with the standard protocol. It is also to be noted that FIGS. 4 and 5 illustrate by way of example only one possible embodiment for segmenting and re-assembling the packets, however, it is contemplated that various methods and changes are possible for the man skilled in the art without departing from the scope of the invention as taught and claimed herein.

E2X packets that can be contained in a single segment are encapsulated in a single segment message (SSM) and do not require reassembly. Furthermore, there exist unprotected segments that do not cause retransmission should they be lost across the link. Unprotected segments cannot be reassembled and, therefore, must be able to contain an entire E2X packet.

The slave maintains a list of received sequence numbers. Every time a new segment is received, the list is checked and trimmed of any consecutive sequence numbers starting at the oldest sequence number and stopping at the first detected gap (non-consecutive sequence numbers). Whereby, the list tracks missing sequence numbers while maintaining a reasonable length.

The list is then checked for any missing sequence numbers (i.e. gaps). A retransmission request can hold up to 6 sequence number to be re-transmitted. These requests are filled by taking the oldest detected gap in order to fill a time critical lost segments and by taking the newest 5 gaps, since these gaps have the greatest chance of successful retransmission. Fewer than 6 segments are re-transmitted, if fewer gaps exist.

Re-transmission by the exporter is possible if a return link from the exgine is available to deliver the re-transmission request to the exporter. However, the exgine can be configured to issue a re-transmission request upon detecting a gap regardless of whether the return link is available or not. The retransmission can be based on the Automatic Repeat Request (ARQ) scheme. A single re-transmission of a bit in error can greatly improve the effective bit error rate BER. For example, in a channel bit rate of $BER=7.65*10^-6$, a single retransmission makes the effective bit rate to be $BEReff=(7.65*10^-6)^2=5.85*10^-11$.

In order to avoid flooding the link by retransmission requests and unnecessary re-transmissions, a new retransmission request is only issued if a minimum configurable time window has passed (150 ms by default). Therefore, the maximum number of re-transmissions are 6 segments every 150 ms or 40 segments per second. Normally, about 40 segments are sent per second depending on configuration options. Therefore, reliable operation cannot be guaranteed for packet loss greater than or approaching 50%, but practically link throughput will limit actual reliable performance to far below this rate of packet loss.

Since multiple exgine=s may request retransmission for the same packet, the master maintains a per-segment transmit time stamp. The master will only retransmit a segment, if it has not already been transmitted within a certain time window. Each exgine can request any packet for re-transmission. If the Encapsulation Slave receives a duplicate packet, it will discard it.

Since retransmission of data packets after they are scheduled to be Aon-air@ is irrelevant, the slave only maintains a list of relevant sequence numbers. All sequence numbers older than the depth of exgine=s packet buffer are removed from the list and, therefore, old packets are no longer re-transmitted. Consequently, a deeper receive packet buffer provides greater data reliability.

The E2X encapsulation master places requested for retransmission packets at the head of its queue for immediate transmission. It is possible to configure the maximum available bandwidth of the network for sending the requested packets in order to avoid network congestion caused by a large number of retransmission requests. Thus, avoiding a cascading collapse of the network.

Bandwidth Scheduling

The Encapsulation Master provides bandwidth proportional scheduling that transmits each segment at a point in time that is rate limited to the STL=s throughput bandwidth (set via a configuration option). It is not sufficient to only send the right data rate to exgine, it is also important to spread out segment transmission such as to minimize buffering through the STL. This makes the STL more responsive by minimizing the necessary throughput delay, which in turn makes the STL more effective for re-transmission, since re-transmissions arrive more quickly. Additionally, multiple E2X encapsulated streams may share the same link bandwidth.

Figure 6:
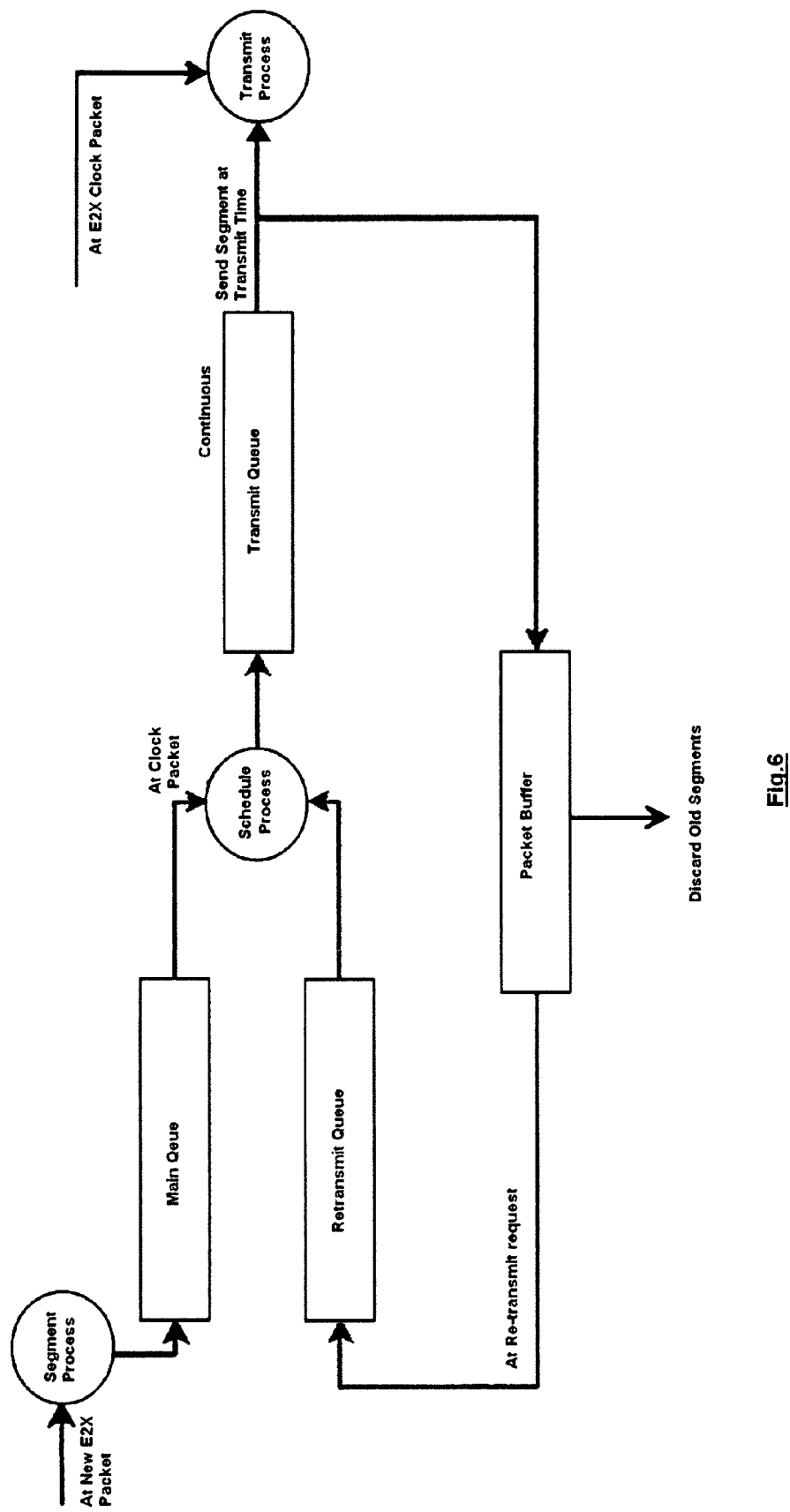
FIG. 6 is a block diagram illustrating the scheduling architecture used at the Encapsulation Master for achieving a constant bit stream.

FIG. 6 is a block diagram illustrating the overall E2X Encapsulation scheduling architecture used to achieve a constant bit rate stream. Any new E2X packet is segmented and placed on the main queue. The scheduler examines both the main queue and the retransmit queue, makes the decision how many segments to place on the transmit buffer and at what time they are to be transmitted. The transmit queue is continuously or at least very frequently checked for any segments to be transmitted. Any segments with an elapsed transmit time are then transmitted to exgine and the segment is then placed on a packet buffer for future retrieval on a retransmission request. Old packet buffer entries can be discarded once one can say that the corresponding data has propagated through the exgine receive buffer.

Figure 7:
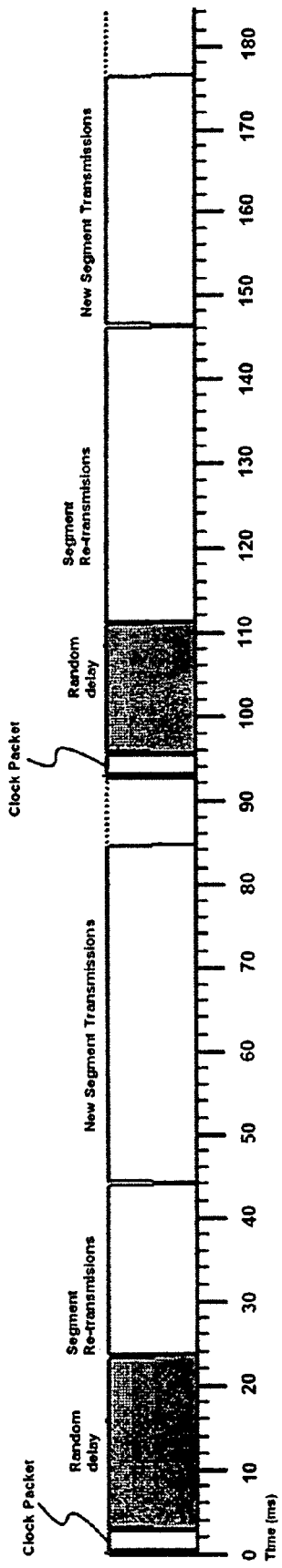
FIG. 7 is graphical scheme of the bandwidth scheduling between the clock packet, segment re-transmissions, segment transmissions, and random delays.

The master attempts to schedule segments in time as shown in FIG. 7. E2X clock packets are fitted with an E2X encapsulation header, but they bypass all scheduling and queuing and are directly sent to exgine.

The scheduling scheme guarantees sufficient bandwidth for new segments to ensure that re-transmissions do not deprive of new data. Any remaining bandwidth is split between a random delay and segment re-transmissions. Segment re-transmissions are performed prior to new segment transmission, because they are more timing critical.

On a 256 kb link, only 2970 Bytes can be sent in a single clock period. As segment PDU lengths are decreased the overall protocol efficiency decreases because more header information must be conveyed. Hence, segment PDU lengths of around 800 bytes present a significant portion of the available bandwidth. If a re-transmitted PDU exceeds its allowable bandwidth, it will borrow bandwidth from the next clock cycle. In other words, the segment is still transmitted, causing the next clock packet to be pushed out in time, but in the next clock cycle fewer bytes are allocated to re-transmissions, causing the next clock packet to be on time and enforcing a maximum configurable bandwidth utilization.

A random packet dispatch delay is inserted in order to allow multiple E2X streams to coexist on the same link. Since two E2X streams will have the same periodicity, if packets are dispatched at the same time, this could consistently cause the other stream=s clock packets to be delayed in time. By having a random delay with uniform PDF (Probability Density Function) across one segment PDU, clock packets of another stream can be multiplexed with the existing stream at random packet boundaries making the effects of another E2X stream appear more like white noise on the exgine PLL. However, the presence or non-presence of another E2X stream will affect average clock packet throughput delay, which can affect the diversity delay of the HDJ system.

The TOS (Type of Service) field of the IP header of an E2X encapsulated segment may be configured arbitrarily. This allows the HDJ traffic to be prioritized across the link. Clock packets and data packets can have different TOS values, allowing clock packets even higher priority over data packets.

E2X encapsulation is specifically designed as a bi-directional UDP implementation in order to allow main/standby exciter configurations. In this case two or more exciters are simultaneously addressed over Ethernet via broadcast or multicast communications. This means that all exciters are transmitting similar (but not identical) content. Sequence numbers, interleaving, and other state may vary across multiple exgine exciters. So a switch over to a standby exciter will cause radio receivers to loose lock and present an audible interruption. However, once exciters are switched over radio receivers can re-sync to the new stream.

Figure 1:
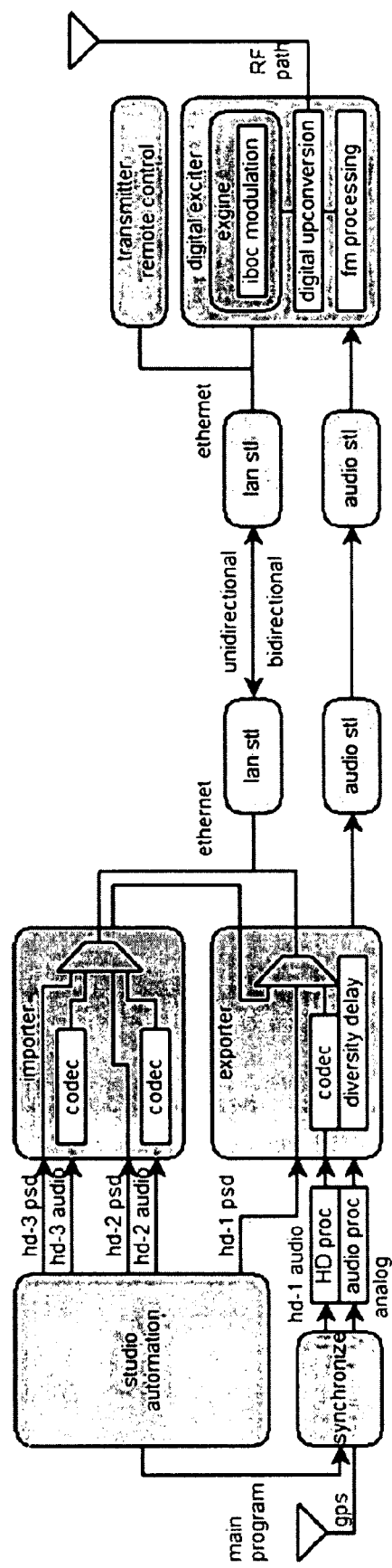
FIG. 1 illustrates the Generation 3 IBOC FM Radio Broadcast Architecture.
Figure 2:
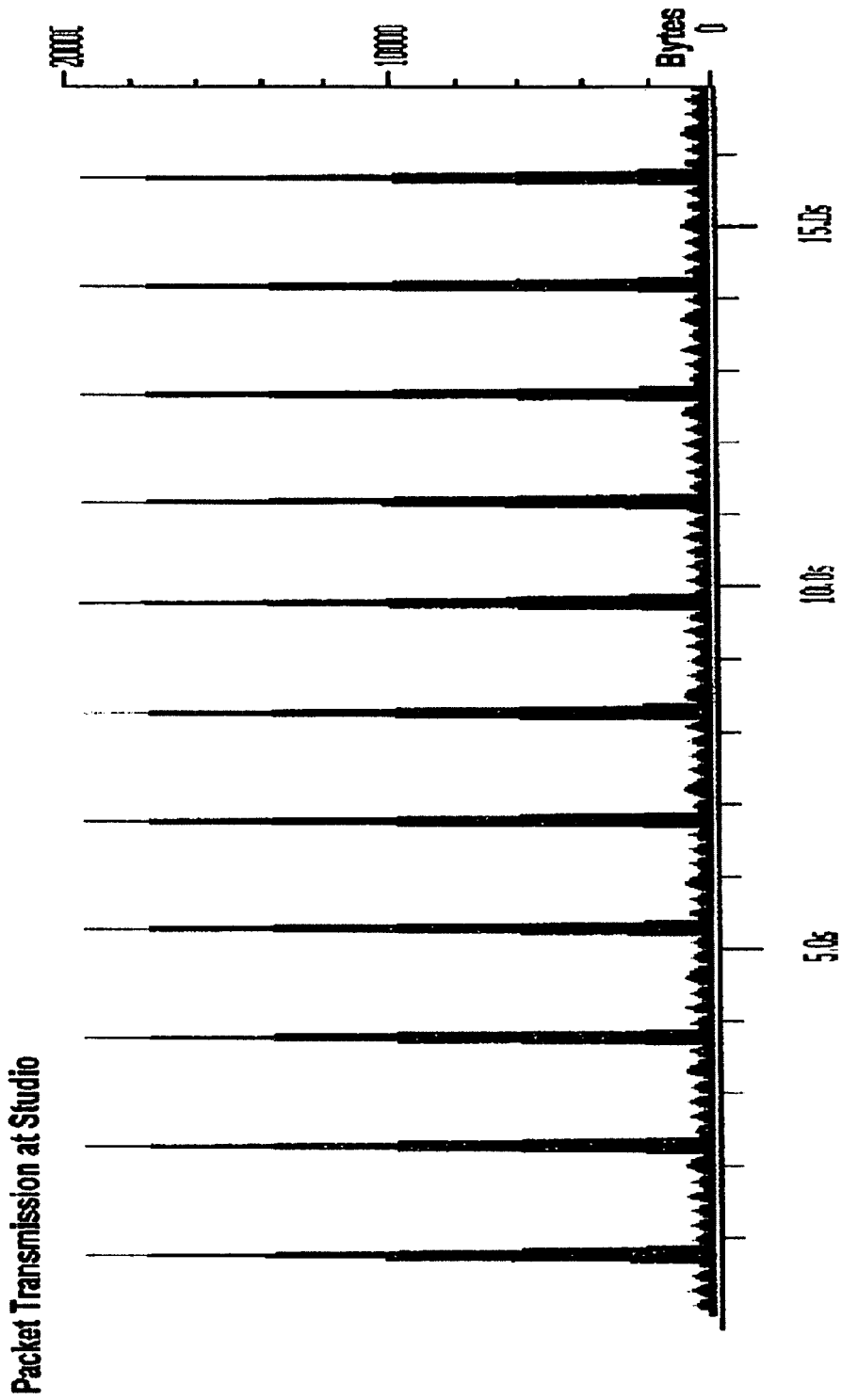
FIG. 2 is a graphical representation of the instantaneous bit rate required by the conventional E2X protocol.
Figure 8:
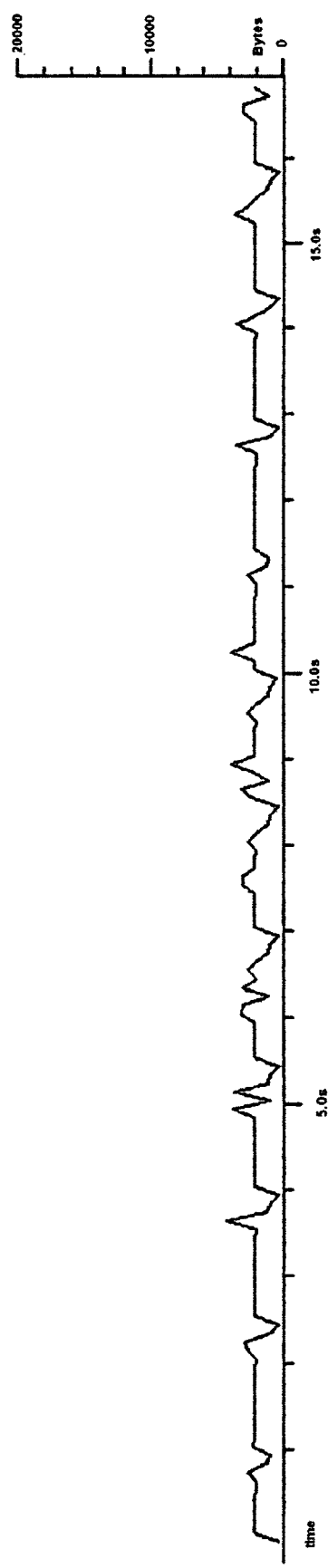
FIG. 8 is a graphical representation illustrating the elimination of the instantaneous bandwidth peaks shown in FIG. 2 by virtue of the E2X Encapsulation Protocol of the present invention.

By virtue of the present invention, network congestion and transmission delays in a bandwidth limited network have been tremendously decreased. As shown in FIG. 8 which illustrates a graphical representation of the instantaneous bit rate required by the E2X Encapsulation protocol, the bandwidth peaks of the standard E2X protocol as shown in FIG. 2, have been tremendously decreased. Therefore, the occurrence of congestions and link failures have been tremendously diminished by virtue of E2X Encapsulation protocol.

Although preferred embodiments of the invention have been disclosed in detail, it will be understood that the invention may be implemented in alternate embodiments and that various changes and modifications may be made to the embodiments illustrated herein without departing from the spirit of the invention or the scope thereof, as defined in the following claims.

The invention claimed is:

1. A method of transmitting an Exporter-to-Exgine (E2X) packet of an E2X data stream from an Exporter over a studio-to-transmitter link (STL) to a plurality of exciter engines (Exgines), the method comprising:
   receiving at the exporter an E2X packet for transmitting to the plurality of Exgines;
   segmenting the received E2X packet into fragment packets of a maximum size;
   placing the segmented fragment packets onto a main queue;
   transmitting a clock packet from the Exporter to the plurality of Exgines over the STL;
   retrieving a maximum number of retransmission packets from a retransmit packet buffer;
   placing the retrieved retransmission packets onto a FIFO transmit queue;
   placing a plurality of segmented fragment packets from the main queue onto the FIFO transmit queue;
   transmitting packets from the FIFO transmit queue of the Exporter to the plurality of Exgines over the STL;
   receiving a first re-transmit request from a first Exgine of the plurality of Exgines identifying a transmitted fragment packet;
   placing the fragment packet identified for retransmission onto the retransmit packet buffer;
   receiving a second re-transmit request from a second Exgine of the plurality of Exgines identifying the transmitted fragment packet; and
   ignoring the second re-transmit request when the second re-transmit request is received within a time window of receiving the first re-transmit request.

2. The method of claim 1, further comprising:
   placing the transmitted packets onto the retransmit packet buffer.

3. The method of claim 1, further comprising:
   associating a time stamp with each of the segmented fragment packets, the time stamp indicating a time at which to transmit the segmented fragment packet;

removing packets from the retransmit packet buffer after the time stamp has expired by a predetermined amount of time.

4. The method of claim 3, wherein the predetermined amount of time is determined based on a receive buffer depth of the plurality of Exgines.

5. The method of claim 3, wherein transmitting packets from the FIFO transmit queue comprises transmitting the packets after the associated time stamp of the packet has expired.

6. The method of claim 1, further comprising:
inserting a random time delay according to a Probability Density Function prior to transmitting the clock packet from the Exporter to the plurality of Exgines over the STL.

7. The method of claim 1, wherein the maximum size of the fragment packets is set based on an amount of bandwidth devoted to the E2X data stream.

8. The method as claimed in claim 1, further comprising:
identifying the fragment packets with an E2X packet identifier to identify the E2X packet the fragment packets belong to and a segment identifier identifying a reassembly order of the fragment packets of the E2X packet.

9. The method of claim 8, further comprising:
placing the transmitted packets onto the retransmit packet buffer; and
retrieving a transmitted packet from the retransmit packet buffer identified by a segment identifier of a received re-transmit request.

10. The method as claimed in claim 8, further comprising:
receiving the first re-transmit request from an Exgine of the plurality of Exgines, comprising a segment identifier of the fragment packet to be re-transmitted;
searching for the requested fragment packet on the retransmit packet buffer; and
placing the fragment packet on the FIFO transmit queue when a matching fragment packet is found on the retransmit packet buffer.

11. The method as claimed in claim 10, further comprising:
removing fragment packets from respective receive packet buffers of each of the plurality of Exgines when enough time has elapsed to allow the fragment packet to process through the respective receive packet buffer of the plurality of Exgines.

12. The method as claimed in claim 10, further comprising:
storing when the first re-transmit request is received;
receiving a subsequent re-transmit request for the fragment packet identified by the same segment identifier;
determining if a retransmit window time has expired between receiving the first re-transmit request and the subsequent re-transmit request for the same fragment packet; and
placing the requested fragment packet on the transmit buffer if the retransmit window time has expired.

13. An apparatus for transmitting an Exporter-to-Exgine (E2X) packet of an E2X data stream from an Exporter over a studio-to-transmitter link (STL) to a plurality of exciter engines (Exgines), the apparatus comprising:
a memory for storing instructions; and
a processor for executing the instructions stored in the memory, the instructions when executed by the processor configuring the apparatus to comprise:
a segment process segmenting an E2X packet into a plurality of fragment packets, each of the fragment packets of a maximum size;
a main queue holding the plurality of fragment packets;
a retransmit packet buffer holding fragment packets that have been transmitted;
a schedule process removing a plurality of fragment packets from the retransmit packet buffer for retransmission to the plurality of Exgines, each of the fragment packets from the retransmit packet buffer requested for re-transmission from at least one of the Exgines, the schedule process ignoring subsequent re-transmit requests for a fragment packet already requested for re-transmission when the subsequent re-transmit request is received within a time window of receiving the re-transmit request for the fragment packet already requested, the schedule process further and removing a plurality of fragment packets from the main queue for transmission to the plurality of Exgines, and transmitting a clock packet from the Exporter to the plurality of Exgines over the STL; and
a transmit queue holding the plurality of fragment packets removed from the retransmit packet buffer and the plurality of fragment packets from the main queue prior to transmitting the fragment packets to the plurality of Exgines.

14. The apparatus of claim 13, wherein the transmitted packets are placed onto the retransmit packet buffer after begin transmitted to the plurality of Exgines.

15. The apparatus of claim 13, wherein the scheduler associates a time stamp with each of the segmented fragment packets, the time stamp indicating a time at which to transmit the segmented fragment packet from the transmit queue.

16. The apparatus of claim 13, wherein the schedule process inserts a random time delay according to a Probability Density Function prior to transmitting the clock packet from the Exporter to the plurality of Exgines over the STL.

17. The apparatus of claim 13, wherein the maximum size of the fragment packets is set based on an amount of bandwidth devoted to the E2X data stream.

18. The apparatus of claim 13, wherein the schedule process retrieves fragment packets from the retransmit packet buffer identified by a segment identifier of a received re-transmit request.

19. The apparatus of claim 13, wherein the schedule process retrieves a fragment packet from the retransmit packet buffer identified by a segment identifier received in a first re-transmit request.

20. The apparatus of claim 19, wherein the schedule process retrieves the fragment packet from the retransmit packet buffer identified by the segment identifier received in the subsequent re-transmit request when a retransmit window time has expired between receiving the first re-transmit request and the subsequent re-transmit request for the same fragment packet.

* * * * *